US012573130B2

(12) United States Patent
Kim et al.

(10) Patent No.: US 12,573,130 B2
(45) Date of Patent: Mar. 10, 2026

(54) METHOD AND SYSTEM PROVIDING TEMPORARY TEXTURE APPLICATION TO ENHANCE 3D MODELING

(71) Applicant: LEIA INC., Menlo Park, CA (US)

(72) Inventors: Chelhwon Kim, Palo Alto, CA (US); Nicolas Dahlquist, Redwood City, CA (US)

(73) Assignee: LEIA SPV LLC, Menlo Park, CA (US)

( * ) Notice: Subject to any disclaimer, the term of this patent is extended or adjusted under 35 U.S.C. 154(b) by 179 days.

(21) Appl. No.: 18/236,338

(22) Filed: Aug. 21, 2023

(65) Prior Publication Data

US 2023/0394740 A1 Dec. 7, 2023

Related U.S. Application Data

(63) Continuation of application No. PCT/US2021/020165, filed on Feb. 28, 2021.

(51) Int. Cl.
*G06T 15/08* (2011.01)
*G06T 7/70* (2017.01)
(Continued)

(52) U.S. Cl.
CPC .............. *G06T 15/08* (2013.01); *G06T 7/70* (2017.01); *G06T 15/04* (2013.01); *G06T 15/503* (2013.01)

(58) Field of Classification Search
CPC .......... G06T 15/08; G06T 7/70; G06T 15/04; G06T 15/503; G06T 17/00; G06T 17/20; G06T 2207/30244
(Continued)

(56) References Cited

U.S. PATENT DOCUMENTS 6,191,794 B1 * 2/2001 Priem ..................... G06T 15/04
345/428
7,667,717 B2 * 2/2010 Baudisch .............. G06T 15/503
715/768
(Continued)

FOREIGN PATENT DOCUMENTS

CA 3210872 9/2022
CN 116917946 10/2023
(Continued)

OTHER PUBLICATIONS

"International Application Serial No. PCT US2021 020165, International Preliminary Report on Patentability mailed Sep. 14, 2023", 7 pgs.
(Continued)

*Primary Examiner* — Sheree N Brown
(74) *Attorney, Agent, or Firm* — Schwegman, Lundberg & Woessner, P.A.

(57) ABSTRACT

Systems and methods are directed to generating a three-dimensional (3D) model of a first image set. The first image set (e.g., input image set) corresponds to different viewing angles of an object that is subject to 3D modeling. A volumetric density function is generated from the first image set. A second image set (e.g., a textured image set) is generated from the volumetric density function and from a predefined color function. The first image set is blended with the second image set to generate a third image set (e.g., an image set with temporary textures). To generate the 3D model, a 3D surface model is generated from the third image set. In addition, a texture map of the 3D surface model is generated from the first image set. A computing system is configured to render the 3D surface model and texture map for display.

14 Claims, 8 Drawing Sheets

(51) Int. Cl.
  *G06T 15/04* (2011.01)
  *G06T 15/50* (2011.01)
(58) Field of Classification Search
  USPC ........................................................... 345/419
  See application file for complete search history.

(56) References Cited

U.S. PATENT DOCUMENTS

| | | | | |
|---|---|---|---|---|
| 8,861,841 | B2 * | 10/2014 | Bell | ........................... G06T 7/32 |
| | | | | 382/154 |
| 10,885,667 | B2 | 1/2021 | Paik et al. | |
| 12,094,054 | B2 * | 9/2024 | Tsai | ...................... G06T 15/506 |
| 2002/0186215 | A1 * | 12/2002 | Cronin | .................... G06T 15/50 |
| | | | | 345/419 |
| 2003/0235344 | A1 * | 12/2003 | Kang | ......................... G06T 7/55 |
| | | | | 382/284 |
| 2011/0128354 | A1 | 6/2011 | Tien et al. | |
| 2011/0170784 | A1 * | 7/2011 | Tanaka | .................. G06T 3/4069 |
| | | | | 382/195 |
| 2011/0231162 | A1 * | 9/2011 | Ramamurthi | ........... G06T 19/20 |
| | | | | 703/2 |
| 2013/0127895 | A1 | 5/2013 | Miller et al. | |
| 2014/0198097 | A1 * | 7/2014 | Evans | ...................... G06T 17/00 |
| | | | | 345/419 |
| 2014/0232742 | A1 * | 8/2014 | Reshetov | .............. G06T 15/503 |
| | | | | 345/613 |
| 2016/0098858 | A1 * | 4/2016 | Patkar | ..................... G06T 7/593 |
| | | | | 345/420 |
| 2017/0358119 | A1 * | 12/2017 | Forutanpour | ......... G06T 11/001 |
| 2018/0162144 | A1 * | 6/2018 | Miller | .................... B41J 3/4078 |
| 2020/0082596 | A1 | 3/2020 | Festa et al. | |
| 2020/0143522 | A1 | 5/2020 | Vogels et al. | |
| 2020/0202611 | A1 | 6/2020 | Wang et al. | |
| 2020/0250885 | A1 | 8/2020 | Bian et al. | |
| 2020/0349757 | A1 * | 11/2020 | Holzer | .................... G06T 17/20 |
| 2021/0150748 | A1 * | 5/2021 | Ciurea | ....................... G06T 7/85 |
| 2021/0225065 | A1 * | 7/2021 | Holzer | ................. H04N 23/611 |
| 2021/0390761 | A1 * | 12/2021 | Kowalski | .............. A63F 13/355 |
| 2023/0030728 | A1 | 2/2023 | Dahlquist | |
| 2024/0331181 | A1 * | 10/2024 | Ciurea | .................... G06T 15/20 |

FOREIGN PATENT DOCUMENTS

| | | |
|---|---|---|
| EP | 4298606 | 1/2024 |
| JP | 2020149174 | 9/2020 |
| JP | 2024508457 | 2/2024 |
| KR | 101828710 B1 | 3/2018 |
| KR | 20230135660 | 9/2023 |
| TW | 201118791 | 6/2011 |
| TW | 202247106 | 12/2022 |
| TW | I810818 | 8/2023 |
| WO | 2022108609 A1 | 5/2022 |
| WO | 2022125128 A1 | 6/2022 |
| WO | 2022173611 A1 | 8/2022 |
| WO | 2022182368 A1 | 9/2022 |
| WO | 2022182369 | 9/2022 |
| WO | 2022182376 A1 | 9/2022 |
| WO | 2023014576 A1 | 2/2023 |
| WO | 2023129214 A1 | 7/2023 |

OTHER PUBLICATIONS

"European Application Serial No. 21928309.0, Response to Communication Pursuant to Rules 161(1) and 162 EPC filed Mar. 1, 2024", 24 pgs.

"Taiwanese Application Serial No. 111105580, Office Action mailed Feb. 21, 2022", w English Translation, 6 pgs.

"Taiwanese Application Serial No. 111105580, Office Action mailed Jun. 15, 2022", w English Translation, 6 pgs.

"Taiwanese Application Serial No. 111105580, Office Action mailed Aug. 24, 2022", w English Translation, 6 pgs.

"Taiwanese Application Serial No. 111105580, Office Action mailed Nov. 16, 2022", w English Translation, 19 pgs.

"Taiwanese Application Serial No. 111105580, Response filed Feb. 17, 2023 to Office Action mailed Nov. 16, 2022", w English Claims, 17 pgs.

"Canadian Application Serial No. 3,210,872, Voluntary Amendment filed Aug. 8, 2023", 31 pgs.

"Japanese Application Serial No. 2023-551970, Notification of Reasons for Refusal mailed Jul. 30, 2024", w English translation, 4 pgs.

"European Application Serial No. 21928309.0, Extended European Search Report mailed Sep. 18, 2024", 8 pgs.

Ballabeni, A., "Advances in Image Pre-Processing to Improve Automated 3D Reconstruction", ISPRS—International Archives of the Photogrammetry, Remote Sensing and Spatial Information Sciences, vol. XL-5 W, (2015), 9 pgs.

Hafeez, Jahanzeb, "3D Surface Reconstruction of Smooth and Textureless Objects", (Feb. 3, 2017), 5 pgs.

Mildenhall, Ben, "NeRF: Representing Scenes as Neural Radiance Fields for view Synthesis", arxiv.org, Cornell University Library, 201 Olin Library Cornell University Ithaca, NY 14853, XP081624988, (Mar. 19, 2020), 21 pgs.

"Canadian Application Serial No. 3,210,872, Office Action mailed Jan. 7, 2025", 6 pgs.

"European Application Serial No. 21928309.0, Response filed Feb. 12, 2025 to Extended European Search Report mailed Sep. 18, 2024", 16 pgs.

International Search Report and Written Opinion (ISRWO) by International Searching Authority (ISA) Korean Intellectual Property Office (KIPO) dated Nov. 25, 2021 (11 pages) for foreign counterpart parent International Application No. PCT/US2021/020165.

* cited by examiner

127

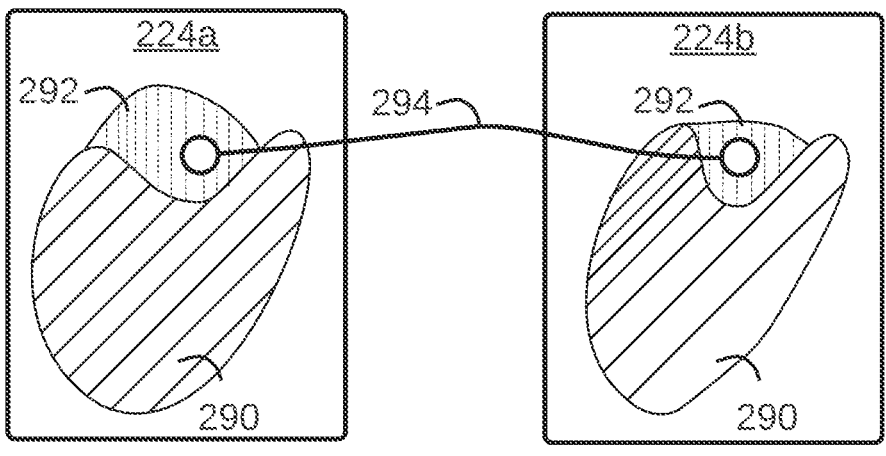
*FIG. 5A*
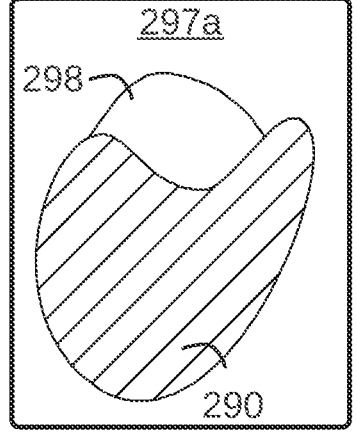 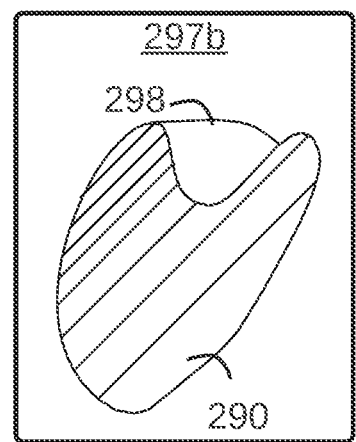
*FIG. 5B*

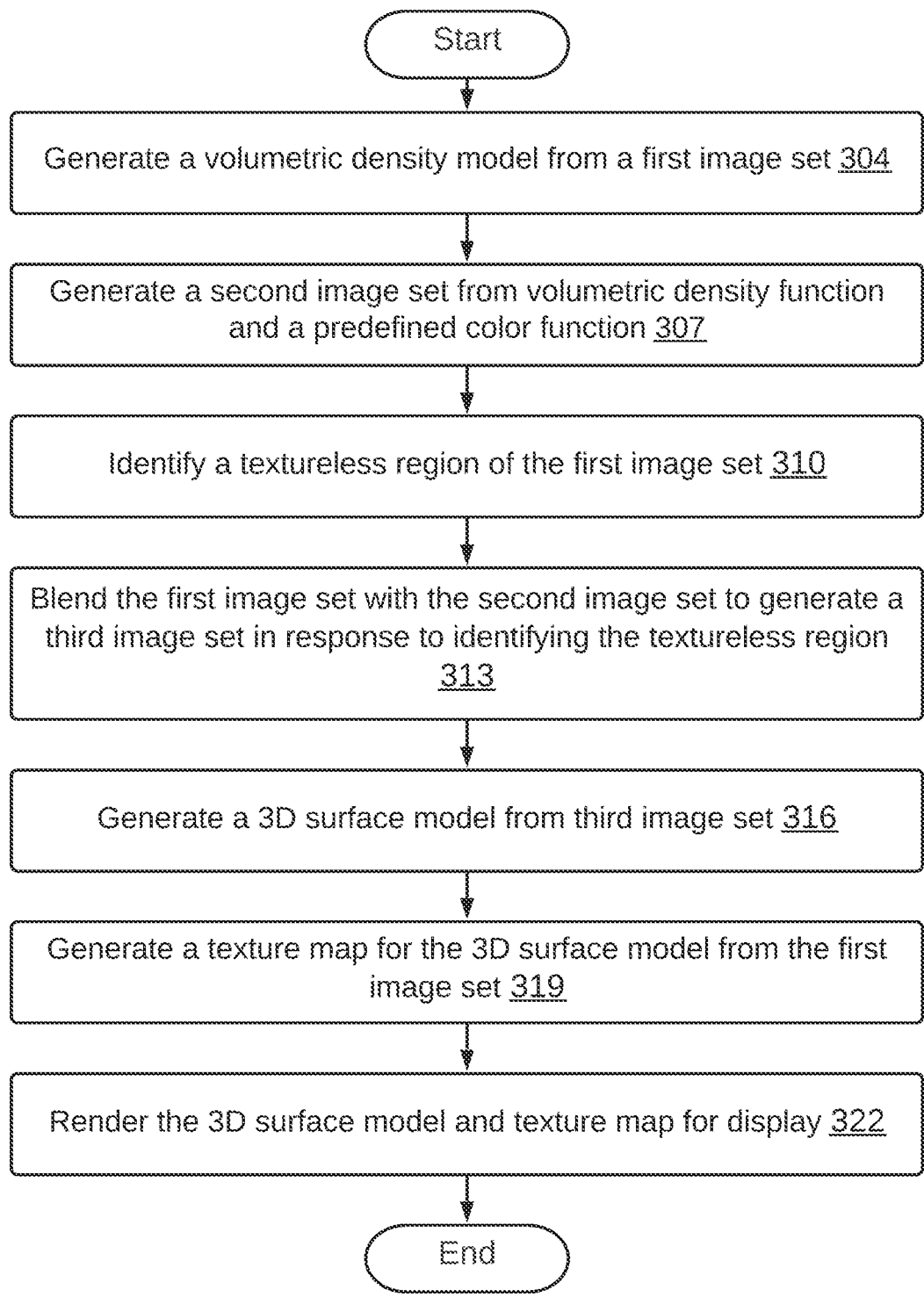

Start

Generate a volumetric density model from a first image set 304

Generate a second image set from volumetric density function and a predefined color function 307

Identify a textureless region of the first image set 310

Blend the first image set with the second image set to generate a third image set in response to identifying the textureless region 313

Generate a 3D surface model from third image set 316

Generate a texture map for the 3D surface model from the first image set 319

Render the 3D surface model and texture map for display 322

End

*FIG. 6*

METHOD AND SYSTEM PROVIDING TEMPORARY TEXTURE APPLICATION TO ENHANCE 3D MODELING

CROSS-REFERENCE TO RELATED APPLICATIONS

This application is a continuation patent application of and claims priority to International Patent Application No. PCT/US2021/020165, filed Feb. 28, 2021, the entirety of which is incorporated by reference herein

STATEMENT REGARDING FEDERALLY SPONSORED RESEARCH OR DEVELOPMENT

N/A

BACKGROUND

Computer graphics are rendered on a display to a user as one or more images. These images may be generated from a three-dimensional (3D) model representing a particular scene. A 3D model may mathematically define one or more objects in terms of shape, size, texture, and other visual parameters. In addition, the 3D model may define how different objects are spatially located with respect to other objects in the 3D model. The 3D model may be formatted as various data structures or files and loaded in memory. Once generated, a computing device may render one or more images of the 3D model for display. The images may be characterized by a particular viewing angle, zoom, and/or location with respect to the 3D model. There may be a variety of techniques used to generate and format 3D models.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which:

FIGS. 5A and 5B illustrate an example of improving a 3D model through the use of temporary textures according to an embodiment consistent with the principles described herein.

FIG. 6 illustrates a flowchart of a system and method of generating a 3D model according to an embodiment consistent with the principles described herein.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide techniques to improve three-dimensional (3D) models generated from an input image set. In particular, embodiments are directed to providing a more reliable way to create 3D models of objects having regions that are textureless (e.g., surfaces having high color uniformity, having shininess). When input images have such textureless regions, it might be difficult to track and correlate the points of those regions across different viewing angles. This leads to lower quality key point data, thereby creating an incomplete or distorted 3D reconstruction result. To address this issue, embodiments are directed to applying a temporary texture to these textureless regions to calculate the surface of the 3D model. The modeled surface will be improved because the temporary textures create the ability to track a common point across different views. In addition, when creating the texture map from the improved surface model, the original images are used. Reusing the original exclude the temporary textures when generating the texture map.

In some embodiments, a pre-trained neural network may be used to encode the geometry of the object in a volume density function before applying a temporary texture. This allows the temporary texture to be applied to the object surface before developing a complete surface model and before running the entire reconstruction pipeline. In some embodiments, a neural radiance field (NeRF) model is generated to create a volumetric density model that defines the volumetric density properties of the 3D model. A pre-defined color function applies a pseudo-random texture to create textured images having the same volumetric density as the input image set. Temporary textures are applied by blending the input image set with the textured images in a manner that applies texture only to textureless areas.

Figure 1:
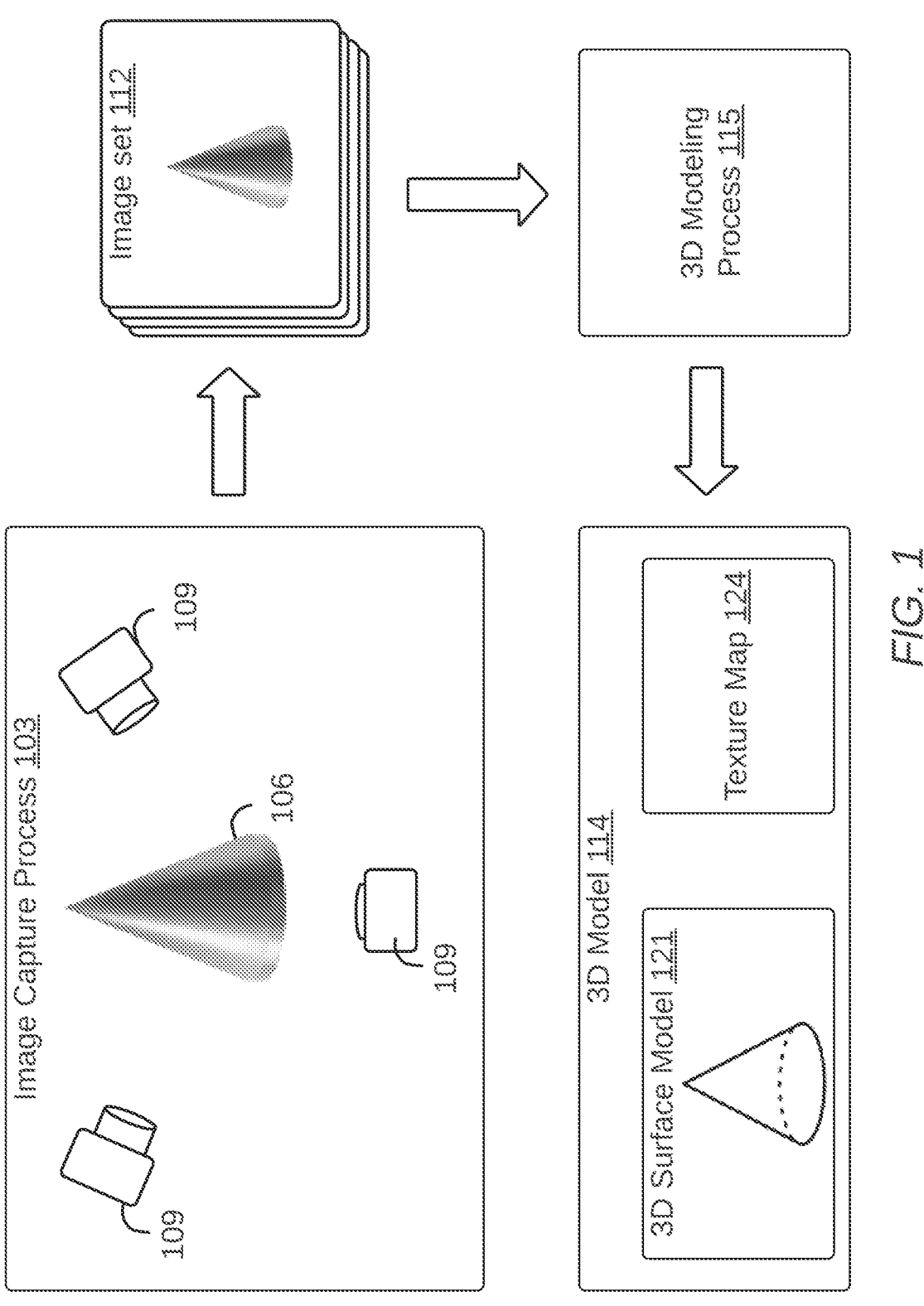
FIG. 1 illustrates a process for converting a physical object into a three-dimensional (3D) model according to an embodiment consistent with the principles described herein.

FIG. 1 illustrates a process for converting a physical object into a 3D model consistent with the principles described herein. FIG. 1 depicts an image capture process 103. The image capture process 103 may take place in a studio or any other physical environment. The goal is to visually capture an object(s) 106 using one or more cameras 109. One or more cameras 109 may capture images of the object 106 from different viewing angles. In some cases, the different views may overlap at least partially, thereby capturing different facets of the object 106. The image capture process 103 therefore converts an object 106 that occupies physical space into an image set 112. The image set 112 may be referred to as an input image set as it is used as an input to generate a 3D model using a 3D modeling process 115. The image set 112 may include a plurality of images that visually represent an object 106 at varying viewing angles. The image set 112 may be formatted and stored in memory in various image formats such as, for example, a bitmap format or a raster format.

The 3D modeling process 115 is a computer-implemented process that converts an image set 112 into a 3D model 114. The 3D modeling process 115 may be implemented as a software program, routine, or module executable by a processor. The 3D modeling process 115 may access memory to retrieve the image set 112 and generate a corresponding 3D model 114. The 3D modeling process 115 more store the 3D model 114 in memory as a file or other data format.

The 3D modeling process 115 may identify key points that are common to at least a subset of images in the image set 112. Herein, a 'key point' is defined as a point of the object 106 that appears in two or more images in the image set. For example, a particular corner of the object 106 may be captured among several images in the image set 112. This particular corner may have varying locations in the image set 112 as it is captured at different viewing angles. The 3D modeling process 115 may identify the particular corner as one of many key points to reconstruct the object 106 as a 3D model 114.

The 3D model 114 may be stored as one or more computer files or data formats that represent the object 106. The 3D model 114 may include a 3D surface model 121 and a texture map 124. The 3D surface model 121 may be file (or part of file) that represents the surface geometry of the object 106. As a result, the surface geometry encodes the contours, shapes and spatial relationships of various features of an object 106. The 3D surface model 121 may comprise a mesh that models the surface of the object 106. The mesh may be formed by various triangles (or other polygons) with coordinates in three dimensions. These polygons may tessellate as non-overlapping geometric shapes that proximate the surface of the object 106. In other embodiments, the 3D surface model 121 may be constructed using a combination of smaller 3D shapes such as spheres, cubes, cylinders, etc.

The texture map 124 contains texture information that is mapped onto the various points defined by the surface geometry specified by the 3D surface module. The texture map may represent the colors, shading, and graphic patterns applied to the 3D surface model 121 of the 3D model 114. As a result, the texture map 124 defines the visual appearance of the modeled object 106. Each surface of the 3D surface model 121 is a region that may be defined by one or more points. The texture map 124 may be a 2D image that has coordinates that are mapped onto the 3D surface. In addition to the 3D surface model 121 and texture map 124, the 3D model 114 may include other information (not shown). For example, the 3D model 114 may include information such as scene information. Scene information may include information regarding a light source, shadows, glare, etc.

3D models 114 may generated for a variety of purposes. At the least, they may be rendered for display so that a viewer can see a graphical representation of a 3D modeled object 106. Applications may build or otherwise load 3D models 114 for a variety of purposes. Applications may calculate one or more views of the 3D model 114 by applying a virtual camera that represents a virtual perspective of the 3D model. The position, zoom, focus, or orientation of the virtual camera may be changed by user input. User input may include navigating through the 3D model 114 by clicking or dragging a cursor, pressing direction buttons, converting the user's physical location to a virtual location within the 3D model 114, etc.

Once a viewer of the 3D model is determined, an application may convert the 3D model 114 into one or more images revealing a window into the 3D model 114. As discussed above, the window may be defined by a virtual camera having a set of coordinates, a viewing angle, zoom, a focus length, orientation, etc. In some embodiments, the rendered images may comprise one or more multiview images. A multiview image has a plurality of views where each of the views corresponds to a different view direction. The views may be rendered contemporaneously (or perceived as being rendered contemporaneous) for display by a multiview display. In this respect, the multiview image may be a 3D image or image configured for a lightfield format. The image may also be a 2D image rendered on a 2D display.

Figure 2A:
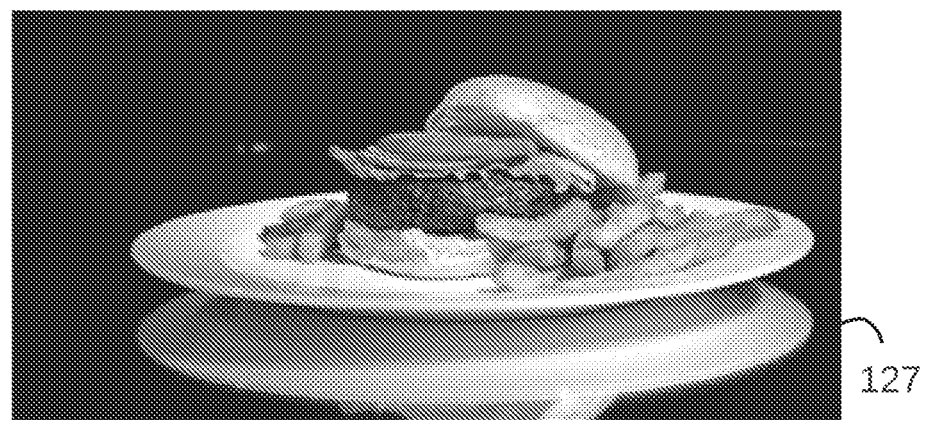
FIGS. 2A and 2B illustrate a failure case for modeling an object having a textureless region according to an embodiment consistent with the principles described herein.
Figure 2B:
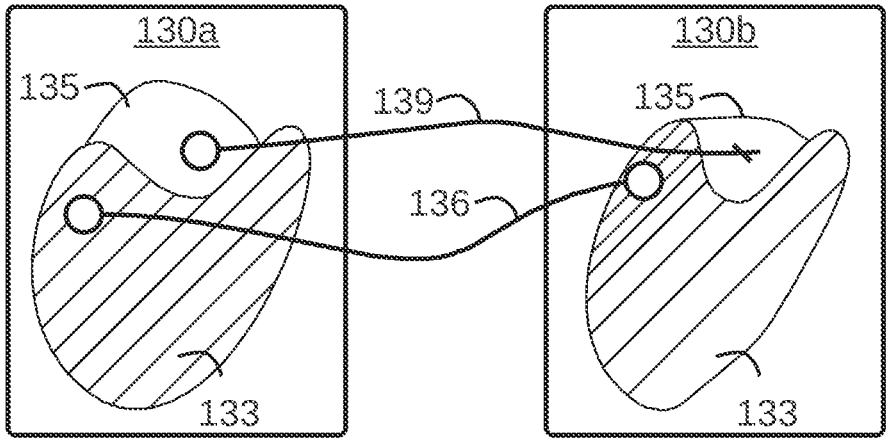

FIGS. 2A and 2B illustrate a failure case for modeling an object having a textureless region according to an embodiment consistent with the principles described herein. A region may include a pixel or a cluster of neighboring pixels. FIG. 2A depicts a scene 127 made up of several objects. An object refers to something that occupies 3D space or can modeled as a 3D object. A scene refers to one or more objects. In this example, the scene 127 includes various objects such as a hamburger, fries, and a white plate. A 3D model may be generated from the scene 127 using, for example, the operations discussed above with respect to FIG. 1. In this respect, a surface geometry and texture map may be generated to model the hamburger as it sits on the white plate surrounded by fries.

Modeling this scene 127 as a 3D model may result in challenges with respect to reconstructing the white plate. The white plate is made up mostly of textureless regions. A 'textureless' region or 'textureless' surface is a portion of an image that has high color uniformity or consistent shininess such that there is little to no color variation. A textureless region may appear the same across different viewing angles. The hamburger and fries have sufficient texture to allow a 3D modeling process to identify key points across different angles. For example, colors or corners of the hamburger or fries may be tracked across different views. However, the white plate appears virtually the same across different viewing angles because it is textureless. It may be difficult to generate sufficient key point data from the white plate. The 3D model of the scene 127 may result in the white plate being distorted or deformed. Textureless regions may therefore lead to a failure case when modeling scenes like, for example, the scene 127 of FIG. 2A.

FIG. 2B provides a more general example of how textureless regions may cause failures when accurately modeling an object. The object is captured in a first view 130a and in a second view 130b. The two views 130a, 130b depicts different, partially overlapping viewing angles of the object. A first region 133 of the object is textured while a second region 135 of the object is textureless. For example, the first region 133 may include color variation, patterns, a color gradient, shadows, or other degree of pixel value variation. The second region 135 may include a generally uniform color variation, lack of pattern, lack of shadows, or an otherwise homogeneous pixel variation. For the first region 133, it may be relatively easy to identify a pair of matched key points 136. For example, the texture of the first region 133 allows for a 3D modelling process to track a point on the object as it is presented in different, overlapping views 130a, 130b. FIG. 2B shows the matched key points 136 of the first region at different locations of different views with respect to the same object. For the second region 135, the lack of texture makes it difficult for detecting a key point between the first view 130a and the second view 130b. FIG. 2B shows an unmatched key point 139. As a result, it may be difficult to accurately calculate surface geometry for the second region 135 of the object.

Figure 3A:
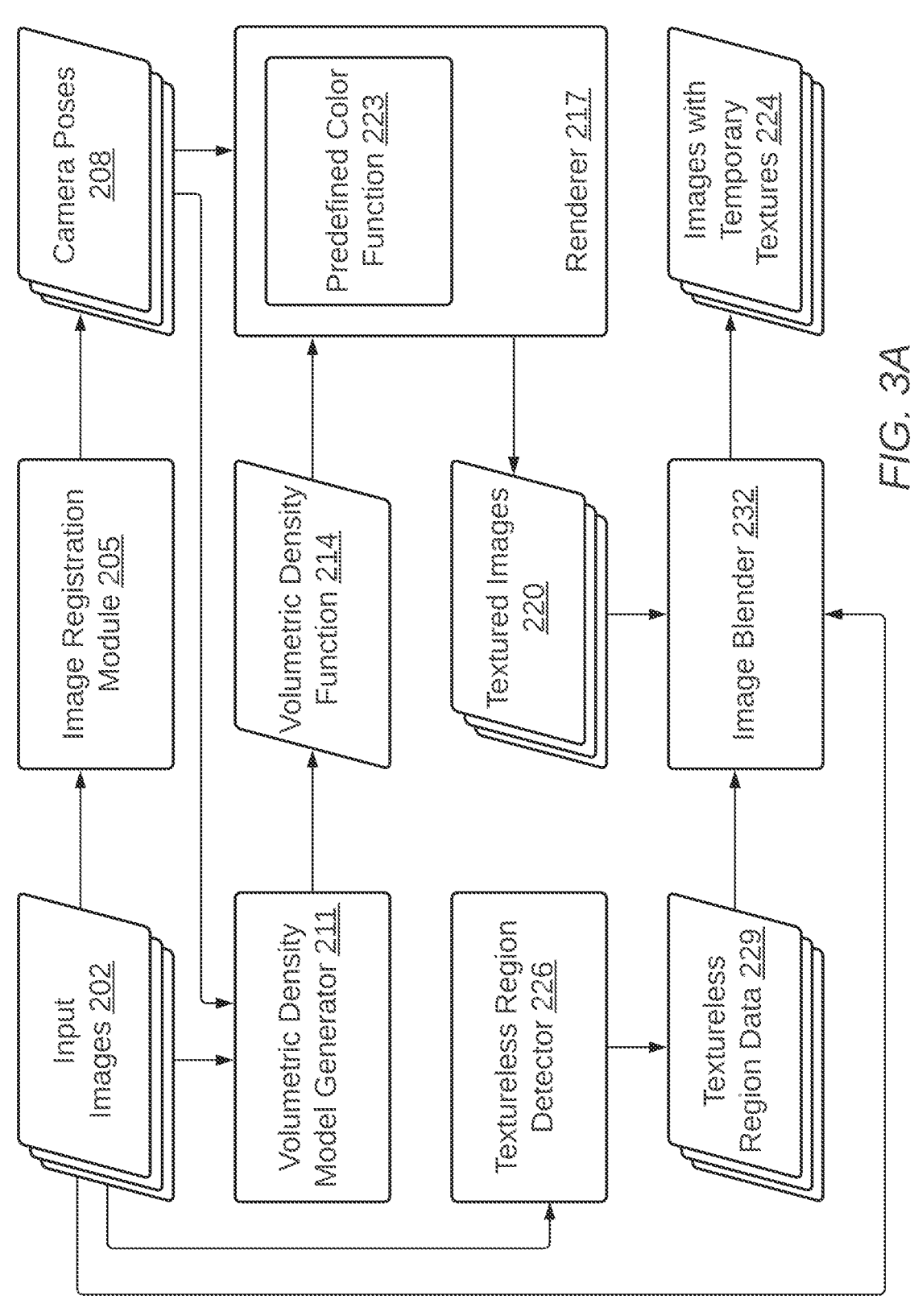
FIGS. 3A and 3B illustrate an example of generating a 3D model according to an embodiment consistent with the principles described herein.
Figure 3B:
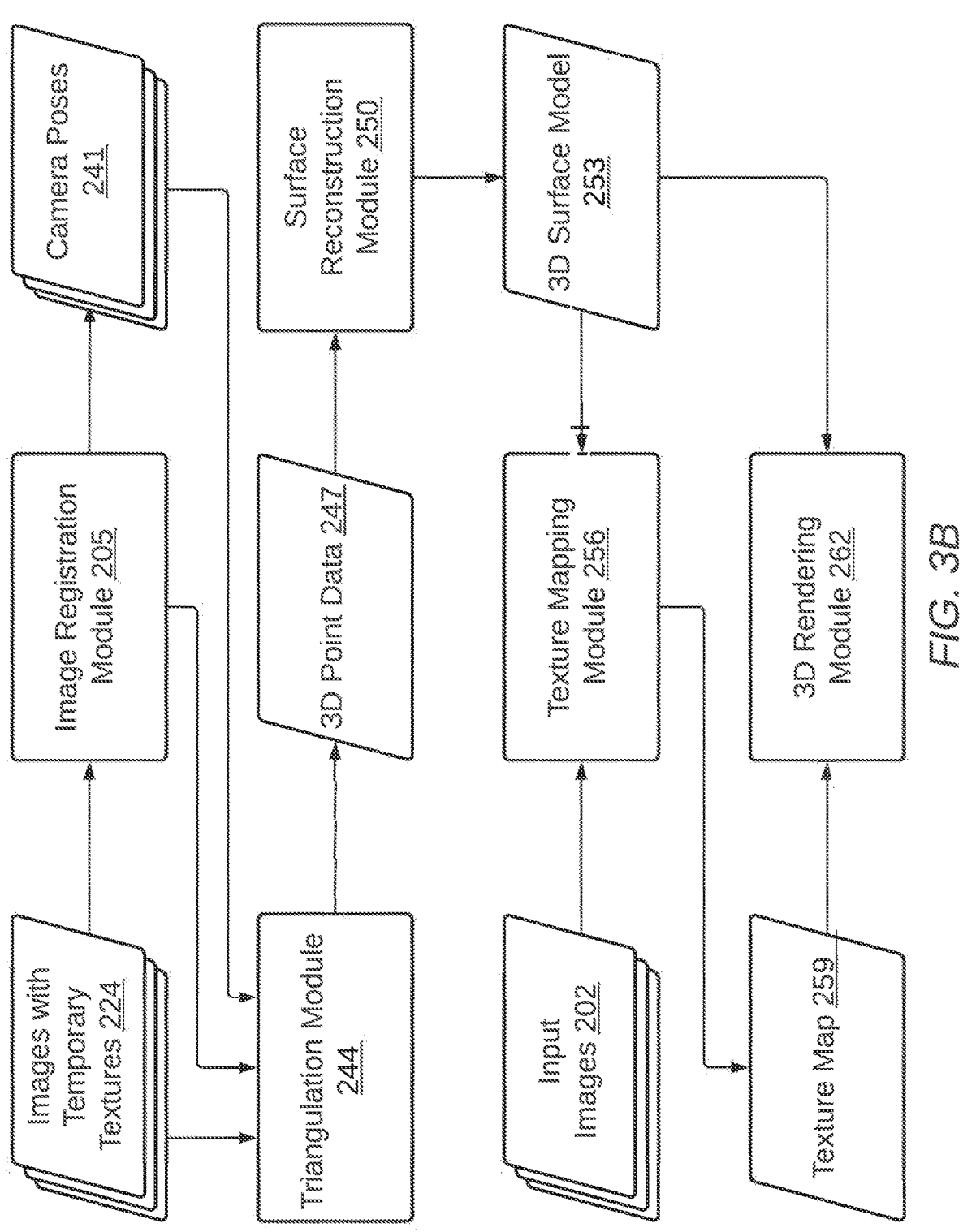

FIGS. 3A and 3B illustrate an example of generating a 3D model according to an embodiment consistent with the principles described herein. FIG. 3A shows how input images of an object are processed to generate images with temporary textures. The temporary textures exist in 3D space to improve the ability to generate key point data across different views of the object. FIG. 3B shows how a 3D model is generated from the images with temporary textures.

Specifically, the 3D model is made up of 3D surface model and a texture map. The images with temporary textures provide a more accurate 3D surface model, while the original input images are used to generate the texture map, thereby excluding the temporary textures from a final rendering of the 3D model.

The operations and data discussed in FIGS. 3A and 3B may be performed by a set of instructions stored in memory and executed by a processor. For example, the functionality described in FIGS. 3A and 3B may be implemented by software application or other computer executable code and the data described in FIGS. 3A and 3B may be stored or loaded in computer memory.

FIG. 3A begins with receiving input images 202 that form a set of images corresponding to different viewing angles of an object. The input images 202 may be an image set 112 similar to the one described in FIG. 1. For example, the input images 202 may depict different views of an object and may be generated from an image capture process 103 such as described in FIG. 1. In some instances, the input images 202 may be referred to as a set of first images or a first image set.

The input images 202 are received by an image registration module 205 that performs image registration. Image registration is a process that determines coordinates for each image. For example, the image registration determines relative positions of the images in the input images 202 to infer the view direction and orientation. This data is recorded as camera poses 208. A camera pose 208 may be identified for each image among the input images 202. A camera pose may be a matrix of elements, where the elements indicate the X, Y, and Z coordinates of the image along with the angular direction of the image. In other words, each camera pose 208 comprises information indicating the position and orientation of the view (e.g., camera) that corresponds to the image. Thus, each image in the input images 202 has a corresponding camera pose 208 that is generated by the image registration module 205. Herein, a 'camera pose' is defined as information that indicates the position and orientation of a viewpoint of an object.

Next, shown in FIG. 3A is a volumetric density model generator 211 that generates a volumetric density model. The volumetric density model may be a volumetric density function 214 that converts a set of input coordinates and orientations into volumetric density values (e.g., opacity, transmittance, transparency, etc.) and color. For example, the volumetric density function 214 may conform to or be similar to the following equation (1):

$$F(x,y,z,\theta,\phi)=(\sigma,color) \qquad (1)$$

where F is the volumetric density function 214 that receives inputs the variables x, y, z, $\theta$, and $\phi$, and outputs the variables $\sigma$ and color. The variable x is the coordinate along the x-axis, the variable $\phi$ is the coordinate along the y-axis, and the variable z is the coordinate along the z-axis. Thus, variables x, y, z are spatial coordinates for the location of a particular input ray. The variable $\theta$ is the angle of the ray between the x-axis and y-axis and variable $\phi$ is the angle of the view between the z-axis and xy-plane. Thus, the variables $\theta$ and $\phi$ define the direction of the ray in 3D space. Together, these input variables mathematically define the orientation of a ray in 3D space. The output $\sigma$ is the opacity (e.g., volumetric density) at a particular point. This may be the transmittance of a particular pixel in 3D space for a particular input ray. When $\sigma$ is at a maximum value (e.g., 1), a solid pixel is present and when $\sigma$ is at a minimum value (e.g., 0), no pixel is present. In between the maximum and minimum is a pixel with some degree of transparency. The color variable represents the color of the pixel (to the extent there is one) with respect to the input ray. The color variable may be in the RGB (red, green blue) format such that it has red, green, and blue pixel values.

The volumetric density function 214 may be referred to as a radiance field function as it outputs the characteristics of a pixel for a given input ray. As a result, an image may be constructed from the volumetric density function 214 by providing a set of input rays that corresponds to a view window. A view window may be a flat rectangle in 3D space such that it faces an object. The view window may be defined as a set of rays that is bounded by the window. The rays may have the same direction (e.g., variables $\theta$ and $\phi$) while ranging along the x, y, and z axes. This is referred to as 'ray-marching,' where a set of rays are inputted into the volumetric density function 214 to construct the pixels that make up the corresponding view. Thus, the volumetric density model comprises a function configured to generate at least a set of volumetric density values corresponding to an input camera pose.

The volumetric density function 214 may be generated by training a neural network model. In some embodiments, the neural network model comprises a neural radiance field (NeRF) model. Herein, a 'NeRF model' is defined as a volumetric model that is generated by estimating scene geometry using a neural network that is trained with a set of images to predict the opacity and color of an object across a continuum of views using a relatively small set of images. Ultimately, the NeRF model comprises a volumetric density function 214 that is generated using a neural network using training data and input images 202.

Specifically, the volumetric density model generator 211 (e.g., a NeRF model generator) receives input images 202 along with corresponding camera poses 208 to generate a volumetric density function 214 (e.g., function F discussed above). For example, the volumetric density model generator 211 generates a volumetric density function 214 from the input images 202 without known camera poses 208 such that the volumetric density function 214 can predict pixel values (and entire images) for viewing angles that are between or beyond the camera poses 208. The volumetric density function 214 may output at least an opacity value(s) or some other volumetric density value(s) based on an input camera pose or input ray.

Embodiments are directed to a renderer 217 that generates textured images 220. Specifically, the renderer 217 generates textured images 220 (e.g., a second image set) from the volumetric density function 214 and a predefined color function 223. Using a predefined color function 223, the renderer 217 applies pseudo-random textures while preserving the volumetric density of the 3D modeled object. In other words, if the volumetric density function 214 outputs a particular color (e.g., the color variable of function F) from an input ray or input camera pose, the renderer 217 replaces the color values with a color generated by the predefined color function 223. This may be referred to as a pseudo-random color or pseudo-random texture because it appears to be arbitrarily applied to the 3D model of the object while still conforming to some deterministic color function. The color function is considered predetermined, because it may be independent of the color of the input images 202 such that it is determined before processing the input images 202. The predetermined color function may include a sinusoidal function and may periodically introduce noise in a pseudo-random manner to create a pseudo-random texture.

The pseudo-random colors provide a pseudo-random texture as defined by the predefined color function 223. A pseudo-random texture may be a marble texture, a cross-hatch texture, a zigzag texture, or any other texture that has substantially high color variation or pixel value variation within a small area. For example, applying a marble texture to the scene of FIG. 2B would result in the scene 127 having the shape and surface contours of a hamburger on a plate with fries while having a color or texture as if the entire scene was carved out of a marble stone. Moreover, this pseudo-random texture is applied in 3D space so that changing viewing angles of the scene would result in the pseudo-random texture being tracked across the viewing angles.

The renderer 217 may generate the textured images 220 from the same camera poses 208. The renderer 217 may also generate textured images 220 from additional camera poses using the ability of the volumetric density function 214 to predict, extrapolate, or interpolate the volumetric density values at new views. The renderer 217 may perform ray marching to provide inputs (e.g., location coordinates, direction, etc.) into the volumetric density function 214 to generate the volumetric density values (e.g., opacity) of the corresponding inputs. The renderer 217 may also generate pseudo-random color values using a predefined color function 223 for each input. The textured images 220 may be stored in memory. The textured images 220 are similar to the input images 202 but instead, apply a pseudo-random texture while preserving the volumetric density of the object captured by the input images 202.

Next, FIG. 3A shows the operations of blending the first image set (e.g., the input images 202) with the second image set (e.g., the textured images 220) to generate the third image set (e.g., images with temporary textures 224). For example, the blending may be selective such that the regions of the input images 202 that are textureless are blended with corresponding regions of the textured image 220. The result are images with temporary textures 224, where the temporary textures are applied only to the regions of the input images 202 that are textureless. The remaining regions in the images with temporary textures 224 appear like the input images 202.

Specifically, a textureless region detector 226 may receive input images 202 to generate textureless region data 229. The textureless region detector 226 may perform various image analysis operations to detect textureless regions. These image analysis operations may be performed on a pixel-by-pixel bitmap of the input images. In some embodiments, the textureless region detector 226 is configured to identify a textureless region of the input images 202 by applying a corner detection operation on the input images 202. A pixel or region that is not neighboring one or more corners or near any edges is considered textureless. In other words, the degree that corners or edges are present for a particular pixel or region corresponds to whether that pixel or region is textureless. A pixel or region having a low degree of corners or edges is considered textureless while a pixel or region having a high degree of corners or edges is textured.

In other embodiments, the textureless region detector 226 may analyze any regions on the input images 202 that comprises pixels within a threshold pixel value variance. For example, a region is considered a textureless region if the pixel value variance is below a threshold value. In this respect, regions of textureless surfaces comprise pixels within a threshold pixel value variance. Pixel value variation refers to the degree that the pixel values (e.g., colors within the RGB-scale) vary among neighboring pixels. Low pixel value variance indicates uniform color across a particular region. High color uniformity is an indication of a textureless region. The textureless region data 229 indicates the locations of textureless regions for each input image 202. For example, the textureless region data 229 may indicate whether each pixel in the input images 202 is within a textureless region. A threshold pixel value variance establishes a amount of pixel value variance for a surface to be considered textureless or textured.

In some embodiments, textureless region detector 226 determines a degree that a particular pixel or region of the input images 202 is textureless. The textureless region data 229 may be a bitmap for each input image 202, where the bitmap pixel value indicates the degree that a corresponding pixel in the input images 202 is part of a textureless region. This is discussed in more detail with respect to FIG. 4.

The textureless region detector 226 may perform operations that include assigning blending weights corresponding to regions of textureless surfaces of the input images 202. The textureless region data 229 may include the blending weights which may be assigned on a pixel-by-pixel basis. The blending weight is function of the degree or amount of texture of pixel in the input images 202. Thus, the blending weight is assigned depending on whether the pixel location is within a textureless region of the input images 202. For example, if a pixel in the input images 202 is within a high texture region, then the pixel is assigned a high blending weight. If the pixel in the input images 202 is within a textureless region, then the pixel is assigned a low blending weight. Thus, the blending weight for a pixel corresponds to the amount of texture associate with that pixel. As mentioned above, the amount of texture associated with a pixel may be quantified based on pixel value uniformity of neighboring pixels.

An image blender 232 is configured to blend the first image set (e.g., the input images 202) with the second image set (e.g., the textured images 220) to generate the third image set (e.g., images with temporary textures 224). The image blender 232 may perform a pixel-by-pixel blending operation where a pixel in a first image and a pixel in a second image (having a corresponding location) have respective pixel values that are mixed or otherwise summed together. Moreover, the blender may apply a blending weight for each pixel. For example, the blender may blend pixels according to the following equation (2):

$$\text{Blended pixel value} = A{*}B + (1-A){*}C \qquad (2)$$

where A is the blending weight between zero and one, B is the pixel value of a pixel in the first image, and C is the pixel value of a corresponding pixel in the second image. By way of example, the blending weight A greater than 0.5, then the resulting blended pixel value will be weighted more towards the pixel in the first image than the corresponding pixel in the second image. A blending weight of one will result in the same pixel in the first image while disregarding the corresponding pixel in the second image. A blending weight of zero will result in the same pixel in the second image while disregarding the corresponding pixel in the first image.

Textureless regions in the input images 202 will result in a blending weight that is weighted towards the textured images 220 while textured regions of the input images 202 will result in a blending weight that is weighted towards the input images 202. Thus, the images with temporary textures 224 may be selectively blended to artificially introduce texture to the input images 202 that are initially textureless.

FIG. 3B shows how a 3D model is generated from input images 202 and the corresponding images with temporary textures 224. The images with temporary textures are provided to the image registration module 205 to identify camera poses 241 for the images with temporary textures 224. The images with temporary textures 224 are better suited for accurately determining key points when compared to the input images 202 due to the introduction of temporary textures. Textures may be considered as 'temporary' because they are eventually excluded from the texture map of the 3D model. However, temporary textures may be used to improve key point detection and matching for obtaining a sufficient number of key points on the textureless regions. Thus, the images with temporary textures 224 allow for more accurate surface geometry modeling.

Next, a triangulation module 244 generates 3D point data 247. The triangulation module 244 identifies a plurality of 3D points using key points received from the image registration module 205 and camera poses 241. For example, through the use of triangulation, a 3D point is determined based on the location of matched key points at different camera poses. Each key point corresponds to a ray defined by the direction of the camera pose 241 for the key point. The point of convergence of these rays for all matched key points results in the location of the 3D point. 3D point data 247 includes various points in 3D space of the object that is represented by the images with temporary textures 224. The use of temporary textures that fill in areas that would otherwise be textureless allow for improved 3D point data 247. The 3D point data 247 may include coordinates in the x-y-z coordinate system that correspond to the surface of the object represented in the images with temporary textures 224.

A surface reconstruction module 250 may convert the 3D point data into a 3D surface model 253 that encodes the surface geometry of the object represented in the images with temporary textures 224. In other words, the surface reconstruction module 250 reconstructs a surface of the object according to the 3D points of the 3D point data 247. This may be similar to the 3D surface model 121 of FIG. 1. The 3D surface model 253 may include a mesh that connects various 3D points in the 3D point data 247 to model the surface of the object. The 3D surface model 253 may be stored as a separate file or part of a file that makes up the 3D model. In this respect, the surface reconstruction module 250 generates the 3D surface model 253 from a third image set (e.g., the images with temporary textures 224).

Next, a texture mapping module 256 generates a texture map 259 for the 3D surface model 253. The texture map 259 may be similar to the texture map 124 of FIG. 1. The texture map 259 for the 3D surface model is generated from the first image set (e.g., the input images 202). As a result, the temporary textures are excluded from consideration when generating the texture map 259 while they were used to generate the surface geometry of the 3D surface model 253.

Ultimately, a 3D model is generated from an object represented by the input images 202. The 3D model has a 3D surface model that is improved through the use of applying temporary textures to at least textureless regions of the input images 202. The 3D model also includes a texture map 259 that is generated from the input images 202, which does not include the temporary textures.

The 3D model may be rendered by a 3D rendering module 262 for display. The 3D rendering module 262 may generate single view or multiview images from the 3D model. In the context of multiview rendering, the 3D rendering module 262 may contemporaneously render a set of views of the object as a multiview image. The 3D rendering module 262 may use a graphics driver to render the 3D model is one or more views.

Figure 4:
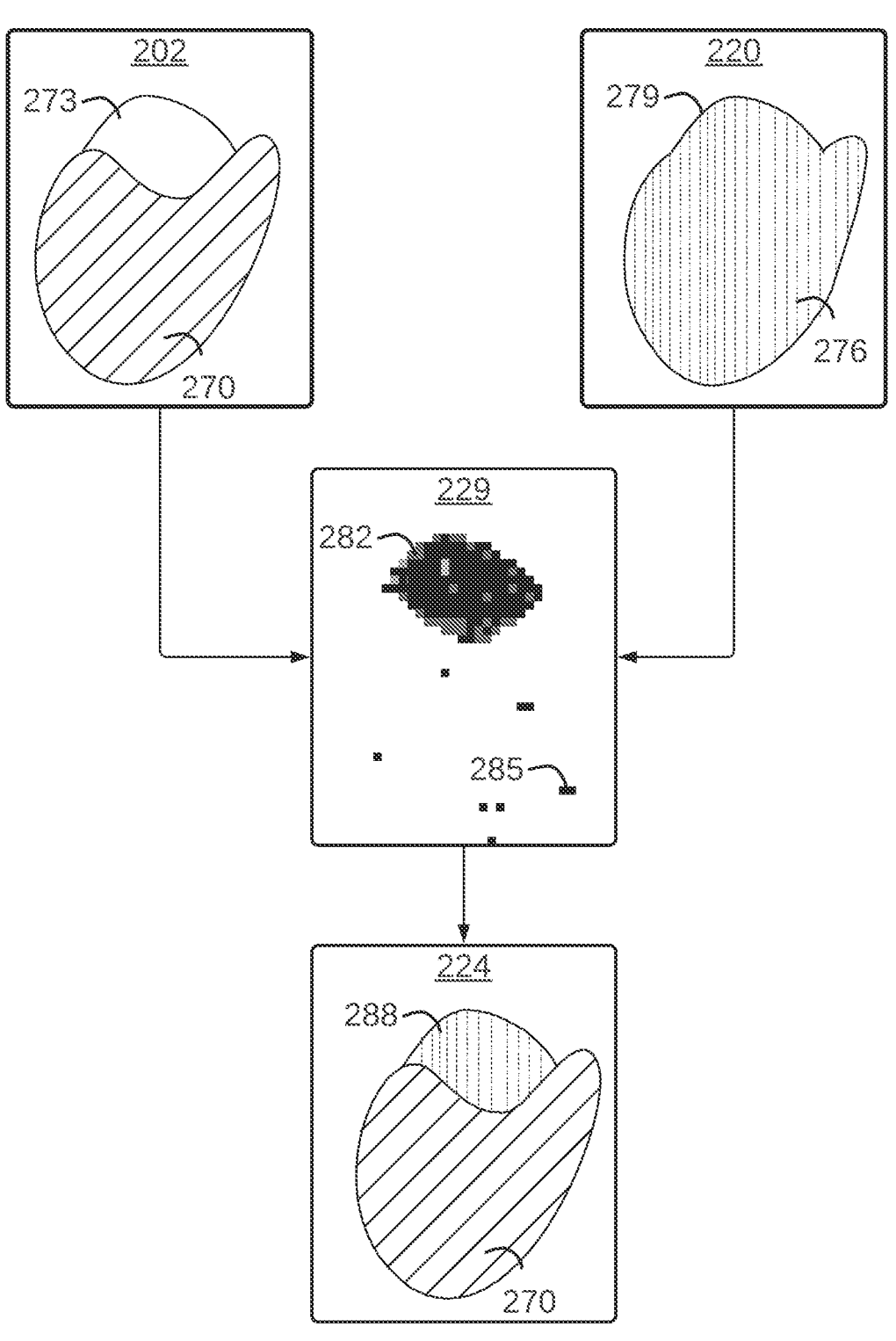
FIG. 4 illustrates an example of applying a temporary texture according to an embodiment consistent with the principles described herein.

FIG. 4 illustrates an example of applying a temporary texture according to an embodiment consistent with the principles described herein. Specifically, FIG. 4 shows one of the input images 202 discussed above with respect to FIGS. 3A and 3B. The input image 202 depicts one view of an object having a textured region 270 and a textureless region 273. The textured region 270 is shown as having diagonal lines indicating the presence of high color variation (e.g., texture), which increases the ability to detect key points across different views of the object. The textureless region 273 is shown as having no pattern indicating the presence of negligible color variation (e.g., no texture), which decreases the ability to detect key points across different views of the object.

A textured image 220 is generated from the input image 202 according to the operations discussed above with respect to FIG. 3A. The volumetric density of the object is preserved so that the overall surface and shape does not change when generating the textured image 220. However, a predefined color function is applied to generate a pseudo-random texture 276 that applied globally to the object. Thus, the object in the textured image 220 adopts a new pseudo-random texture 276 shown as vertical dashed lines while having the same shape 279 (e.g., surface or outline) of the input image 202.

FIG. 4 also shows selectively blending the input image 202 and the textured image 220 to generate an image with temporary textures 224. Specifically, textureless region data 229 (shown as a bitmap mask in an embodiment) is generated by analyzing the input image 202 to determine regions that are textureless. In the example of FIG. 4, the textureless region data 229 is a bitmap mask having the same pixelwise dimensions of the input image 202 and textured image 220. This bitmap mask has pixels that correspond to pixel pairs in the input image 202 and textured image 220, respectively. For example, the upper left-most pixel of the input image 202 and the upper left-most pixel of the textured image 220 correspond to the upper left-most pixel of the bitmap mask. Each pixel value indicates a respective blending weight. For example, a high pixel value (e.g., a whiter or brighter pixel) indicates a blending weight that favors the input image 202 while a low pixel value (e.g., a blacker or darker pixel) indicates a blending weight that favors the textured image 220. The bitmap mask has a first region 282 of blacker pixels. This first region 282 maps to the textureless region 273 of the input image 202. There may be other smaller regions 285 that also map to textureless regions of the input image. The bitmap mask may be determined by analyzing color variations surrounding a target pixel. The degree of color variation around a target pixel determines whether the target pixel is part of a textured or textureless region and/or the extent that the target pixel forms a textureless region. The target pixel is assigned a pixel value as shown in the bitmap mask. The pixel value is graphically represented as a particular shade (e.g., white, black, gray, etc.). The pixel value corresponds to a blending weight. In some embodiments, to determine the pixel value, a corner detection operation may be performed on each pixel, where the degree of the presence of a corner corresponds to the pixel value.

The bitmap mask may be used to perform a weighted blend of the input image 202 and the textured image 220. As a result, pixels within the blacker regions (e.g., the first region 282 or smaller regions 285) will take on pixel values closer to the corresponding pixels of the textured image 220. Pixels within the whiter regions (regions other than the first region 282 or smaller regions 285) will take on pixel values closer to the corresponding pixels of the input image 202.

The image with temporary textures 224 has the original textured region of the input image 202 while having the pseudo-random texture 276 of the textured image 220 at location of the textureless region 273. The location of the textureless region 273 is specified by the bitmap mask as a first region 282. Thus, the image with temporary textures 224 has a temporary texture 288 that is applied by selectively blending the input image 202 with the textured image 220.

FIGS. 5A and 5B illustrate an example of improving a 3D model through the use of temporary textures according to an embodiment consistent with the principles described herein. FIG. 5A depicts images with temporary textures shown as a first view 224*a* and second view 224*b*. The object represented in the various, different views 224*a*, 224*b* has an originally textured region 290. The originally textured region 290 is maintained from the original input images (e.g., input images 202 of FIGS. 3A and 3B) that are used to generate the first view 224*a* and second view 224*b*. In addition, the original input images had a textureless region that was modified to include a temporary texture 292. The temporary texture 292 may be applied by selectively blending the input images with textured images as discussed in FIG. 3A. FIG. 5A shows how the use of temporary textures improves the ability to detect more key points and match them as matched key points 294 that are tracked across the different views 224*a*, 224*b*. The increase in key point data quality provides an improved 3D surface model (e.g., the 3D surface model 253 of FIG. 3B).

FIG. 5B depicts a first rendered view 297*a* and a second rendered view 297*b* generated from both the improved 3D surface model (e.g., the 3D surface model 253 of FIG. 3B) as well as a texture map (e.g., the texture map 259 of FIG. 3B) generated directly from the input images that include the original textured or textureless regions. The texture map is generated to preserve the originally textured region 290 while excluding the temporary texture 292 resulting in the originally textureless surface 298. As a result, the 3D model is properly reconstructed from input images having textureless regions. Rendered views 297*a*, 297*b* may be rendered from this 3D model, which preserves the original color and texture of the input images.

FIG. 6 illustrates a flowchart of a system and method of generating a three-dimensional (3D) model according to an embodiment consistent with the principles described herein. The flowchart of FIG. 6 provides one example of the different types of functionality implemented by a computing device executing an instruction set. As an alternative, the flowchart of FIG. 6 may be viewed as depicting an example of elements of a method implemented in a computing device according to one or more embodiments.

At item 304, the computing device generates a volumetric density function (e.g., the volumetric density function 214 of FIG. 3A) from a first image set. The first image set may be set of input images (e.g., the input images 202 of FIGS. 3A and 3B) that are received from memory. The first image set may be generated according to an image capture process (e.g., the image capture process 103 of FIG. 1). The first image set may correspond to different viewing angles of an object. For example, each image in the input image set represents a different view of the object. The volumetric density function may determine a set of volumetric density values corresponding to an input camera pose. In this respect, the volumetric density function is a reconstruction of the object expressed in the first image set. The output may be a set of volumetric density values (e.g., opacity) based on an input camera pose (e.g., viewing window having a particular location and direction).

The computing system may use a neural network model to generate the volumetric density function. The computing system may include the computing device discussed below with respect to FIG. 7 or include at least some of the components of the computing device discussed below with respect to FIG. 7. For example, the neural network model may comprise a neural radiance field (NeRF) model. The neural network model may be generated by identifying a plurality of camera poses of the first image set and generating the volumetric density function from the camera poses. For example, an image registration module (e.g., the image registration module 205 of FIG. 3A) may be used to identify camera poses of each image in the first image set. The first image set may have at least one textureless region. This may lead to camera poses having relatively lower accuracy.

At item 307, the computing device generates a second image set (e.g., textured images 220 of FIG. 3A) from the volumetric density function and from a predefined color function (e.g., the predefined color function 223 of FIG. 3A). A renderer may be used to input various camera poses into the volumetric density function to generate the second image set. In addition, the predefined color function may apply a pseudo random texture when generating the second image set. The predefined color function may generate color patterns that texturize the output. Thus, if the volumetric density function outputs a particular color, the predefined color function may override the output color using a predefined color to introduce texture to the second image set while preserving the surface geometry of the object.

Next, the computing device blends the first image set with the second image set to generate a third image set (e.g., images with temporary textures 224). The third image set may preserve the originally textured regions of the first image set while replacing textureless regions of the first image set with temporary textures that are generated. The blending of the first image set and second image set are described with respect to items 310, and 313 according to embodiments.

At item 310, the computing device identify a textureless region of the first image set. This may be done by applying a corner detection operation on the first image set to determine whether a region is a textureless region. For example, the textureless region may be identified by applying a corner detection operation on the first image set on a pixel-by-pixel or region-by-region basis. The computing device may use image recognition or a neural network to perform corner detection to identify regions defined by the corners. A corner is an intersection of two edges. A region may be considered a textureless region if the textureless region comprises pixels within a threshold pixel value variance. In this respect, a pixel or region associated with a corner or edges may have high pixel value variance while a pixel or region within little to no corners/edges may have low pixel value variance.

In some embodiments, blending weights may be set for each pixel in the first image set where the blending weight indicates whether the pixel is in or part of a textureless region. The blending weight may correspond to the degree of texture at a particular pixel location. Thus, the computing device may assign a blending weight indicating whether a pixel is at least part of a textureless region of the first image set. The blending weights may be formatted as a bitmap mask such that the blending weights are set on a pixel-by-pixel basis (e.g., for each pixel).

At item 313, the computing device blends the first image set with the second image set to generate a third image set by in response to identifying the textureless region. For example, the third image set is similar to the first image set in all regions except for textureless regions. The blending operation may use blending weights to specify the location of the textureless regions as illustrated in the example of FIG. 4. Thus, the third image set adopts blended pixels values weighted towards the first image set (in regions where there is texture with respect to the first image set) or adopts blended pixel values weighted towards the second image set (in regions where there is no texture with respect to the first image set).

At item 316, the computing device generates a 3D surface model (e.g., the 3D surface model 253 of FIG. 3B) from the third image set. The third image set is generated to have no textureless regions as it is a blend of the first image set and second image set. The 3D surface model may be generated by identifying a plurality of camera poses of the third image set. And image registration process may determine the camera poses. Because the third image set lack textureless regions, it may yield to more accurate camera poses. Next, 3D surface model generation may involve identifying a plurality of 3D points within the third image set using the plurality of camera poses. This may be done by performing triangulation between points along the objects surface (as represented in a particular view) and the coordinates of the corresponding camera pose. Next, a surface of the object is reconstructed according to the 3D points. This may involve generating a mesh that approximates the surface of the object. The 3D surface model may be formatted to include the surface geometry without any texture information.

At item 319, the computing device generates a texture map (e.g., the texture map 259 of FIG. 3B) for the 3D surface model from the first image set. By directly using the first image set, the original, textureless regions may be mapped onto the 3D surface model.

At item 322, the computing device renders the 3D surface model and texture map for display. For example, the 3D surface model and texture map together form a 3D model of the object that is represented by the first image set. The computing device may render this 3D model as a single view of the object or as a multiview image that comprises contemporaneously rendered views of the object at varying viewing angles. The multiview image, therefore, may provide at least a stereoscopic view of the object that is generated from the 3D model.

The flowchart of FIG. 6 discussed above may illustrate a system or method of generating a 3D model having functionality embodied as an instruction set. If embodied in software, each box may represent a module, segment, or portion of code that comprises instructions to implement the specified logical function(s). The instructions may be embodied in the form of source code that comprises human-readable statements written in a programming language, object code that is compiled from source code, or machine code that comprises numerical instructions recognizable by a suitable execution system, such as a processor a computing device. The machine code may be converted from the source code, etc. If embodied in hardware, each block may represent a circuit or a number of interconnected circuits to implement the specified logical function(s).

Although the flowchart of FIG. 6 shows a specific order of execution, it is understood that the order of execution may differ from that which is depicted. For example, the order of execution of two or more boxes may be scrambled relative to the order shown. Also, two or more boxes shown may be executed concurrently or with partial concurrence. Further, in some embodiments, one or more of the boxes may be skipped or omitted or may be performed contemporaneously.

Figure 7:
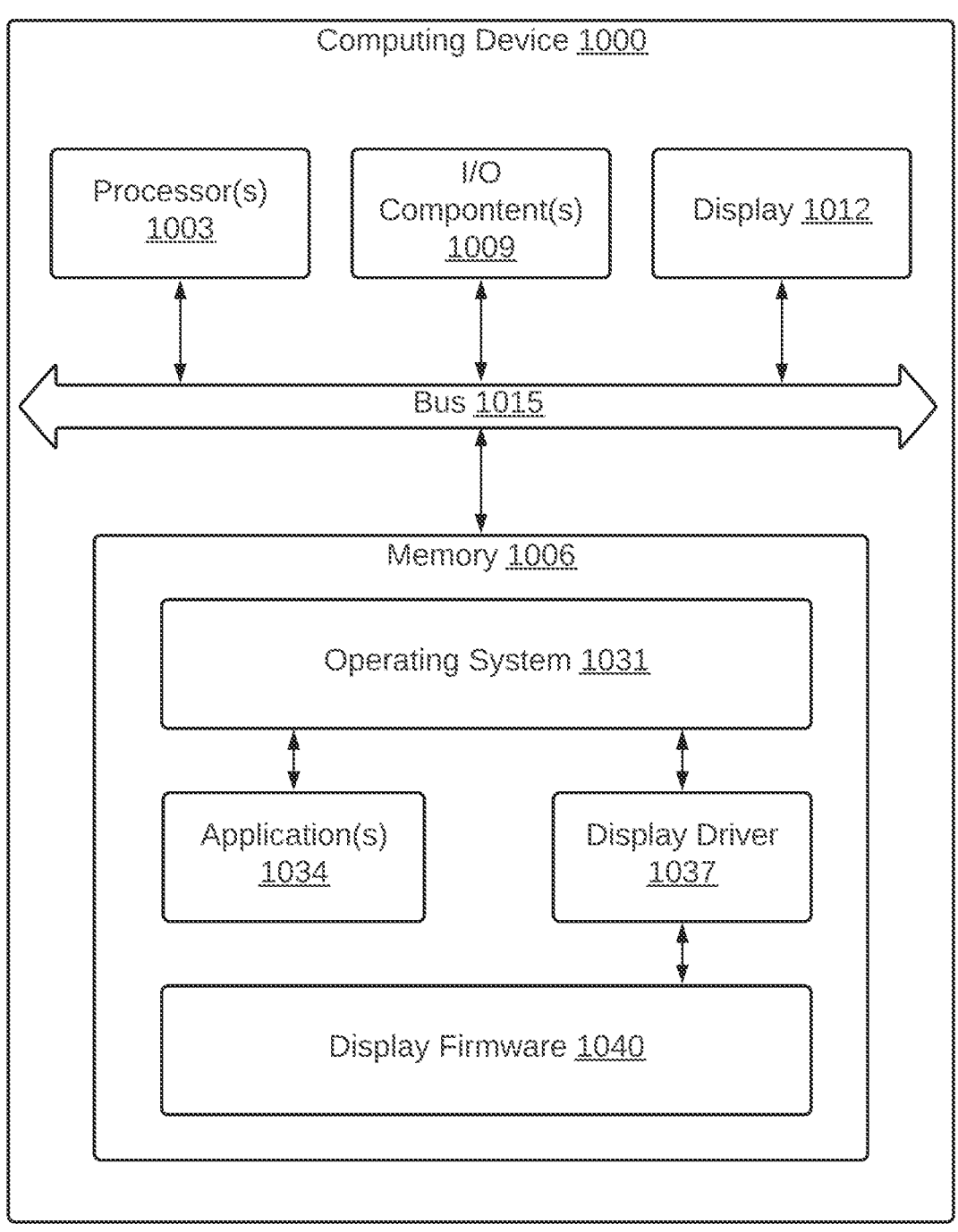
FIG. 7 is a schematic block diagram that depicts an example illustration of a computing device that generates and renders a 3D model for display according to an embodiment consistent with the principles described herein.

FIG. 7 is a schematic block diagram that depicts an example illustration of a computing device that generates and renders a 3D model for display according to an embodiment consistent with the principles described herein. The computing device 1000 may include a system of components that carry out various computing operations for a user of the computing device 1000. The computing device 1000 is an example of a computing system. For example, the computing device 1000 may represent components of 3D model generation system. The computing device 1000 may be a laptop, tablet, smart phone, touch screen system, intelligent display system, other client device, server, or other computing device. The computing device 1000 may include various components such as, for example, a processor(s) 1003, a memory 1006, input/output (I/O) component(s) 1009, a display 1012, and potentially other components. These components may couple to a bus 1015 that serves as a local interface to allow the components of the computing device 1000 to communicate with each other. While the components of the computing device 1000 are shown to be contained within the computing device 1000, it should be appreciated that at least some of the components may couple to the computing device 1000 through an external connection. For example, components may externally plug into or otherwise connect with the computing device 1000 via external ports, sockets, plugs, or connectors.

A processor 1003 may include a central processing unit (CPU), graphics processing unit (GPU), any other integrated circuit that performs computing processing operations, or any combination thereof. The processor(s) 1003 may include one or more processing cores. The processor(s) 1003 comprises circuitry that executes instructions. Instructions include, for example, computer code, programs, logic, or other machine-readable instructions that are received and executed by the processor(s) 1003 to carry out computing functionality that are embodied in the instructions. The processor(s) 1003 may execute instructions to operate on data. For example, the processor(s) 1003 may receive input data (e.g., an image), process the input data according to an instruction set, and generate output data (e.g., a processed image). As another example, the processor(s) 1003 may receive instructions and generate new instructions for subsequent execution. The processor 1003 may comprise the hardware to implement a graphics pipeline to render images generated by applications or images derived from 3D models. For example, the processor(s) 1003 may comprise one or more GPU cores, vector processors, scaler processes, or hardware accelerators.

The memory 1006 may include one or more memory components. The memory 1006 is defined herein as including either or both of volatile and nonvolatile memory. Volatile memory components are those that do not retain information upon loss of power. Volatile memory may include, for example, random access memory (RAM), static random access memory (SRAM), dynamic random access memory (DRAM), magnetic random access memory (MRAM), or other volatile memory structures. System memory (e.g., main memory, cache, etc.) may be implemented using volatile memory. System memory refers to fast memory that may temporarily store data or instructions for quick read and write access to assist the processor(s) 1003. Images may be stored or loaded in memory for subsequent access.

Nonvolatile memory components are those that retain information upon a loss of power. Nonvolatile memory includes read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive. The ROM may comprise, for example, a programmable read-only memory (PROM), an erasable programmable read-only memory (EPROM), an electrically erasable programmable read-only memory (EEPROM), or other like memory device. Storage memory may be implemented using nonvolatile memory to provide long term retention of data and instructions.

The memory 1006 may refer to the combination of volatile and nonvolatile memory used to store instructions as well as data. For example, data and instructions may be stored in nonvolatile memory and loaded into volatile memory for processing by the processor(s) 1003. The execution of instructions may include, for example, a compiled program that is translated into machine code in a format that can be loaded from nonvolatile memory into volatile memory and then run by the processor 1003, source code that is converted in suitable format such as object code that is capable of being loaded into volatile memory for execution by the processor 1003, or source code that is interpreted by another executable program to generate instructions in volatile memory and executed by the processor 1003, etc. Instructions may be stored or loaded in any portion or component of the memory 1006 including, for example, RAM, ROM, system memory, storage, or any combination thereof.

While the memory 1006 is shown as being separate from other components of the computing device 1000, it should be appreciated that the memory 1006 may be embedded or otherwise integrated, at least partially, into one or more components. For example, the processor(s) 1003 may include onboard memory registers or cache to perform processing operations.

I/O component(s) 1009 include, for example, touch screens, speakers, microphones, buttons, switches, dials, camera, sensors, accelerometers, or other components that receive user input or generate output directed to the user. I/O component(s) 1009 may receive user input and convert it into data for storage in the memory 1006 or for processing by the processor(s) 1003. I/O component(s) 1009 may receive data outputted by the memory 1006 or processor(s) 1003 and convert them into a format that is perceived by the user (e.g., sound, tactile responses, visual information, etc.).

A specific type of I/O component 1009 is a display 1012. The display 1012 may include a multiview display, a multiview display combined with a 2D display, or any other display that presents images. A capacitive touch screen layer serving as an I/O component 1009 may be layered within the display to allow a user to provide input while contemporaneously perceiving visual output. The processor(s) 1003 may generate data that is formatted as an image for presentation on the display 1012. The processor(s) 1003 may execute instructions to render the image on the display for the user.

The bus 1015 facilitates communication of instructions and data between the processor(s) 1003, the memory 1006, the I/O component(s) 1009, the display 1012, and any other components of the computing device 1000. The bus 1015 may include address translators, address decoders, fabric, conductive traces, conductive wires, ports, plugs, sockets, and other connectors to allow for the communication of data and instructions.

The instructions within the memory 1006 may be embodied in various forms in a manner that implements at least a portion of the software stack. For example, the instructions may be embodied as an operating system 1031, an application(s) 1034, a device driver (e.g., a display driver 1037), firmware (e.g., display firmware 1040), or other software components. The operating system 1031 is a software platform that supports the basic functions of the computing device 1000, such as scheduling tasks, controlling I/O components 1009, providing access to hardware resources, managing power, and supporting applications 1034.

An application(s) 1034 executes on the operating system 1031 and may gain access to hardware resources of the computing device 1000 via the operating system 1031. In this respect, the execution of the application(s) 1034 is controlled, at least in part, by the operating system 1031. The application(s) 1034 may be a user-level software program that provides high-level functions, services, and other functionality to the user. In some embodiments, an application 1034 may be a dedicated 'app' downloadable or otherwise accessible to the user on the computing device 1000. The user may launch the application(s) 1034 via a user interface provided by the operating system 1031. The application(s) 1034 may be developed by developers and defined in various source code formats. The applications 1034 may be developed using a number of programming or scripting languages such as, for example, C, C++, C#, Objective C, Java®, Swift, JavaScript®, Perl, PHP, Visual Basic®, Python®, Ruby, Go, or other programming languages. The application(s) 1034 may be compiled by a compiler into object code or interpreted by an interpreter for execution by the processor(s) 1003.

Device drivers such as, for example, the display driver 1037, include instructions that allow the operating system 1031 to communicate with various I/O components 1009. Each I/O component 1009 may have its own device driver. Device drivers may be installed such that they are stored in storage and loaded into system memory. For example, upon installation, a display driver 1037 translates a high-level display instruction received from the operating system 1031 into lower level instructions implemented by the display 1012 to display an image.

Firmware, such as, for example, display firmware 1040, may include machine code or assembly code that allows an I/O component 1009 or display 1012 to perform low-level operations. Firmware may convert electrical signals of particular component into higher level instructions or data. For example, display firmware 1040 may control how a display 1012 activates individual pixels at a low level by adjusting voltage or current signals. Firmware may be stored in nonvolatile memory and executed directly from nonvolatile memory. For example, the display firmware 1040 may be embodied in a ROM chip coupled to the display 1012 such that the ROM chip is separate from other storage and system memory of the computing device 1000. The display 1012 may include processing circuitry for executing the display firmware 1040.

The operating system 1031, application(s) 1034, drivers (e.g., display driver 1037), firmware (e.g., display firmware 1040), and potentially other instruction sets may each comprise instructions that are executable by the processor(s) 1003 or other processing circuitry of the computing device 1000 to carry out the functionality and operations discussed above. Although the instructions described herein may be embodied in software or code executed by the processor(s) 1003 as discussed above, as an alternative, the instructions may also be embodied in dedicated hardware or a combination of software and dedicated hardware. For example, the functionality and operations carried out by the instructions discussed above may be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc.

In some embodiments, the instructions that carry out the functionality and operations discussed above may be embodied in a non-transitory, computer-readable storage medium. For example, embodiments are directed to a non-transitory, computer-readable storage medium storing executable instructions that, when executed by a processor (e.g., processor 1003) of a computing system (e.g., computing device 1000) cause the processor to perform various functions discussed above, including operations to generate a 3D model from an input image set. The non-transitory, computer-readable storage medium may or may not be part of the computing device 1000. The instructions may include, for example, statements, code, or declarations that can be fetched from the computer-readable medium and executed by processing circuitry (e.g., the processor(s) 1003). Has defined herein, a 'non-transitory, computer-readable storage medium' is defined as any medium that can contain, store, or maintain the instructions described herein for use by or in connection with an instruction execution system, such as, for example, the computing device 1000, and further excludes transitory medium including, for example, carrier waves.

The non-transitory, computer-readable medium can comprise any one of many physical media such as, for example, magnetic, optical, or semiconductor media. More specific examples of a suitable non-transitory, computer-readable medium may include, but are not limited to, magnetic tapes, magnetic floppy diskettes, magnetic hard drives, memory cards, solid-state drives, USB flash drives, or optical discs. Also, the non-transitory, computer-readable medium may be a random access memory (RAM) including, for example, static random access memory (SRAM) and dynamic random access memory (DRAM), or magnetic random access memory (MRAM). In addition, the non-transitory, computer-readable medium may be a read-only memory (ROM), a programmable read-only memory (PROM), an erasable programmable read-only memory (EPROM), an electrically erasable programmable read-only memory (EEPROM), or other type of memory device.

The computing device 1000 may perform any of the operations or implement the functionality described above. For example, the flowchart and process flows discussed above may be performed by the computing device 1000 that executes instructions and processes data. While the computing device 1000 is shown as a single device, embodiments are not so limited. In some embodiments, the computing device 1000 may offload processing of instructions in a distributed manner such that a plurality of computing devices 1000 operate together to execute instructions that may be stored or loaded in a distributed arrangement of computing components. For example, at least some instructions or data may be stored, loaded, or executed in a cloud-based system that operates in conjunction with the computing device 1000.

Thus, there have been described examples and embodiments of generating a 3D model from an input image set. This may be done by applying pseudo-random textures generated by a color function to a volumetric density model of the object. This generates a texturized version of the object (resulting in no textureless regions) such that the object preserves its original volumetric density. A 3D surface model is generated from the texturized version (or a blended version of the textured version) while a texture map is generated from the input image set. Thus, the 3D model has the same textures as the object represented by the input image set while its surface geometry is generated from a texturized version. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A computer-implemented method of providing a three-dimensional (3D) model, the method comprising:
   generating a volumetric density function from a first image set, the first image set corresponding to different viewing angles of an object;
   generating a second image set from the volumetric density function and from a predefined color function;
   blending the first image set with the second image set to generate a third image set;
   generating a 3D surface model from the third image set; and
   generating a texture map for the 3D surface model from the first image set,
   wherein the 3D surface model and texture map are configured to be rendered for display;
   wherein blending comprises:
      assigning a blending weight indicating whether a pixel is part of a textureless region of the first image set; and
      blending the first image set with the second image according to the blending weight; and
   wherein the textureless region comprises pixels within a threshold pixel value variance.

2. The method of claim 1, wherein the volumetric density function generates a set of volumetric density values corresponding to an input camera pose.

3. The method of claim 2, wherein the volumetric density function is a neural network model that comprises a neural radiance field model.

4. The method of claim 1, further comprising:
   identifying a plurality of camera poses of the first image set; and
   generating the volumetric density function from the camera poses.

5. The method of claim 1, wherein generating the 3D surface model of the third image set comprises:
   identifying a plurality of camera poses of the third image set;
   identifying a plurality of 3D points within the third image set using the plurality of camera poses of the third image set; and
   reconstructing a surface of the object according to the 3D points.

6. The method of claim 1, wherein rendering the 3D surface model and texture map for display comprises contemporaneously rendering a set of views of the object as a multiview image.

7. A three-dimensional (3D) model generation system comprising:

a processor; and a memory that stores a plurality of instructions, which, when executed, cause the processor to:

generate a volumetric density model from a first image set, the first image set corresponding to different viewing angles of an object;

generate a second image set from volumetric density model, wherein a pseudo-random texture is applied to generate the second image set;

blend the first image set with the second image set to generate a third image set;

generate a 3D surface model from the third image set; and generate a texture map for the 3D surface model from the first image set, wherein a computing system is configured to render the 3D surface model and the texture map for display;

wherein blending comprises:

assigning a blending weight indicating whether a pixel is part of a textureless region of the first image set; and blending the first image set with the second image according to the blending weight; and wherein the textureless region comprises pixels within a threshold pixel value variance.

8. The system of claim 7, wherein the volumetric density model comprises a function configured to determine a set of volumetric density values corresponding to an input camera pose.

9. The system of claim 7, wherein the volumetric density model comprises a neural radiance field model.

10. The system of claim 7, wherein the memory that stores the plurality of instructions, which, when executed, further cause the processor to:

identify a plurality of camera poses of the first image set; and generate the volumetric density model from the first image set according to the camera poses.

11. The system of claim 7, wherein the memory that stores the plurality of instructions, which, when executed, further cause the processor to:

identify a plurality of camera poses of the third image set;

identify a plurality of 3D points within the third image set using the plurality of camera poses of the third image set; and reconstruct a surface of the object according to the 3D points to generate the 3D surface model.

12. The system of claim 7, wherein the 3D surface model and texture map are configured to be rendered for display by contemporaneously rendering a set of views of the object as a multiview image.

13. A non-transitory, computer-readable storage medium storing executable instructions that, when executed by a processor of a computing system, performs operations to generate a three-dimensional (3D) model of a first image set, the operations comprising:

generating a neural radiance field (NeRF) model from the first image set, the first image set corresponding to different viewing angles of an object;

generating a second image set from the NeRF model and a predefined color function;

blending the first image set with the second image set to generate a third image set;

generating a 3D surface model from the third image set; and generating a texture map for the 3D surface model from the first image set, wherein the computing system is configured to render the 3D surface model and texture map for display:

wherein blending comprises:

assigning a blending weight indicating whether a pixel is part of a textureless region of the first image set; and blending the first image set with the second image according to the blending weight; and wherein the textureless region comprises pixels within a threshold pixel value variance.

14. The non-transitory, computer-readable storage medium of claim 13, wherein the 3D surface model and texture map are configured to be rendered for display by contemporaneously rendering a set of views of the object as a multiview image.

* * * * *